United States Patent
Bea et al.

(10) Patent No.: US 8,222,878 B2
(45) Date of Patent: Jul. 17, 2012

(54) CURRENT MODE DC-DC CONVERTER HAVING A PULSE WIDTH MODULATION SIGNAL OF REDUCED DELAY

(75) Inventors: Sung-Hoon Bea, Nowon-gu (KR); Hwan Cho, Goyeng-si (KR)

(73) Assignee: Dongbu HiTek Co., Ltd., Seoul (KR)

( * ) Notice: Subject to any disclaimer, the term of this patent is extended or adjusted under 35 U.S.C. 154(b) by 287 days.

(21) Appl. No.: 12/642,992

(22) Filed: Dec. 21, 2009

(65) Prior Publication Data

US 2010/0164453 A1 Jul. 1, 2010

(30) Foreign Application Priority Data

Dec. 30, 2008 (KR) .................. 10-2008-0136939

(51) Int. Cl.
*G05F 1/00* (2006.01)

(52) U.S. Cl. ........ 323/282; 323/271; 323/274; 323/275; 323/284

(58) Field of Classification Search .................. 323/271, 323/275, 282, 283, 284, 285, 289
See application file for complete search history.

(56) References Cited

U.S. PATENT DOCUMENTS

| | | | |
|---|---|---|---|
| 7,545,126 B2 * | 6/2009 | Su et al. | 323/273 |
| 7,868,600 B2 * | 1/2011 | Qiu et al. | 323/282 |
| 7,888,925 B2 * | 2/2011 | Dequina | 323/284 |
| 8,064,230 B2 * | 11/2011 | Gong et al. | 363/21.09 |
| 2007/0279819 A1 * | 12/2007 | Schopfer | 361/93.1 |
| 2009/0167261 A1 * | 7/2009 | Trochut | 323/234 |

* cited by examiner

*Primary Examiner* — Adolf Berhane
*Assistant Examiner* — Lakaisha Jackson
(74) *Attorney, Agent, or Firm* — Sherr & Vaughn, PLLC

(57) ABSTRACT

A voltage regulator uses a comparing apparatus having hysteresis characteristics. The voltage regulator includes a comparator for comparing a comparison voltage with a reference voltage, and outputs a result of the comparison; a switching controller for generating a plurality of switching signals in response to the comparison result; resistors connected in the form of a string, to divide the comparison voltage into a plurality of voltages; and a switching box for selecting one of the plural voltages, as the comparison voltage, in response to the switching signals.

20 Claims, 4 Drawing Sheets

CURRENT MODE DC-DC CONVERTER HAVING A PULSE WIDTH MODULATION SIGNAL OF REDUCED DELAY

This application claims the benefit under 35 U.S.C. §119 to Korean Patent Application No. 10-2008-0136939 (filed on Dec. 30, 2008), which is hereby incorporated by reference in its entirety.

BACKGROUND

A DC-DC converter converts an input voltage and an input current, to output a constant voltage and a particular current value. The current output from the DC-DC converter to a load may be reduced and in this case, degradation in efficiency may occur. Such a phenomenon may be caused by the propagation delay of a signal generated from a pulse width modulation (PWM) comparator included in the DC-DC converter (hereinafter, referred to as a "PWM" signal).

FIG. 1A depicts waveforms of a PWM signal and a current $I_L$ flowing through a load in a high load state. FIG. 1B depicts waveforms of the PWM signal and the current $I_L$ flowing through the load in a low load state. FIG. 1C depicts waveforms in the case in which the PWM signal is skipped in the low load state.

As the PWM signal is delayed ($t_{Delay}$), the ON time of an internal power transistor increases. As a result, a load current (indicated by a hatched portion) is also increased which, in turn, increases power consumption. This is called "switching loss".

The "high load state" refers to a state in which a large current flows through the load as the internal power transistor is turned on. The "low load state" refers to a state in which a small current flows through the load. In the low load state, the influence of the switching loss is more than that in the high load state. In the low load state, accordingly, the efficiency of the DC-DC converter is further reduced due to the increased switching loss.

The ON or OFF time of the internal power transistor may be determined in accordance with the frequency of the PWM signal to control the internal power transistor. As the ON time of the internal power transistor increases, the current flowing through the load is increased. For example, in the case of a DC-DC converter for an AMOLED, the DC-DC converter may operate in a low load state due to high-frequency operation thereof. In such a low-load operation, the influence of switching loss caused by the delayed ON time of the internal power transistor in the DC-DC converter is very high. Meanwhile, in the low load state, a long discharge time occurs due to a small discharge amount of current, as shown in FIG. 1B. Furthermore, in the low load state, the delay time $t_{Delay}$ of the PWM comparator influences the discharge time. As a result, there may be problems in that the ripple of the load current $I_L$ increases, or the pulses of the PWM signal may be skipped.

SUMMARY

Embodiments relate to a DC-DC converter capable of varying a resistance value used to determine a sense ratio of a sense amplifier used in a general current mode converter in accordance with a load state, thereby securing a stable operation.

Embodiments relate to a current mode DC-DC converter that includes a pulse width modulation (PWM) signal generator for outputting a PWM signal; a power switch unit connected between a first voltage and a ground voltage, the power switch unit being turned on or off based on the PWM signal; and a sense amplifier unit for sensing a current flowing through the power switch unit, and outputting the sensed current, the sense amplifier unit controlling the sensing current based on a load control signal, wherein the PWM signal is controlled based on the sensing current controlled by the sense amplifier unit.

A sense amplifier unit may include a sense amplifier for amplifying a first sensing voltage sensed based on the current flowing through the power switch unit and a second sensing voltage, and outputting a result of the amplification, a sensing load unit for supplying the second sensing voltage to the sense amplifier, and controlling the second sensing voltage based on the load control signal, and a sensing switch for outputting the sensing current according to the sensing voltage in response to the output from the sense amplifier.

Also, a sense amplifier unit may include a sense amplifier having a first input terminal connected to the power switch unit, and a second input terminal, a sensing load unit connected between a first voltage and the second input terminal, to control a resistance value between the first voltage and the second input terminal based on the load control signal, and a sensing switch connected between the second input terminal and the PWM signal generator, the sensing switch being turned on or off in response to an output from the sense amplifier.

A sensing load unit may include a first resistor connected between the first voltage and the second input terminal, a second resistor connected to the first voltage at one end of the second resistor, a load switch connected between the other end of the second resistor and the second input terminal, the load switch being turned on or off based on the load control signal, and a sensing switch connected between the second input terminal and the PWM signal generator, the sensing switch being turned on or off in response to the output from the sense amplifier.

DRAWINGS

DESCRIPTION

Reference will now be made in detail to embodiments in association with a comparing apparatus having hysteresis characteristics, examples of which are illustrated in the accompanying drawings.

Figure 1A:
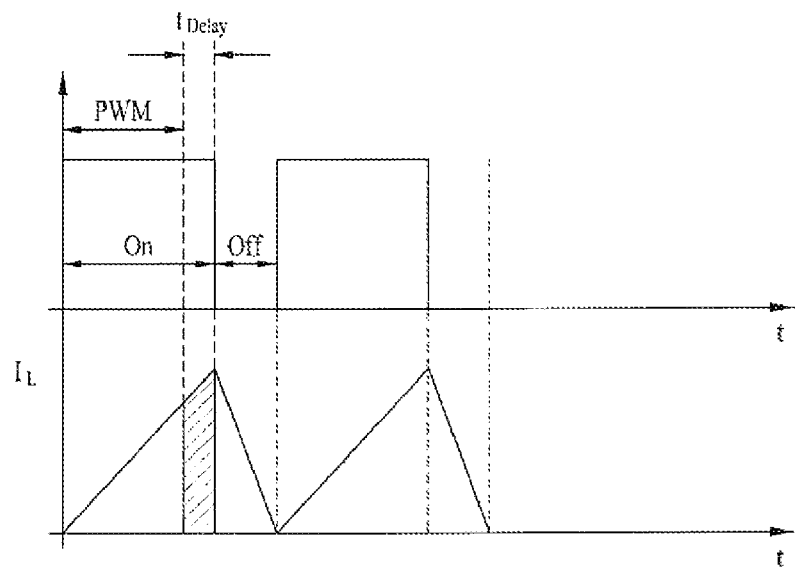
FIG. 1A is a waveform diagram of a pulse width modulation (PWM) signal and a current flowing through a load in a high load state.
Figure 1B:
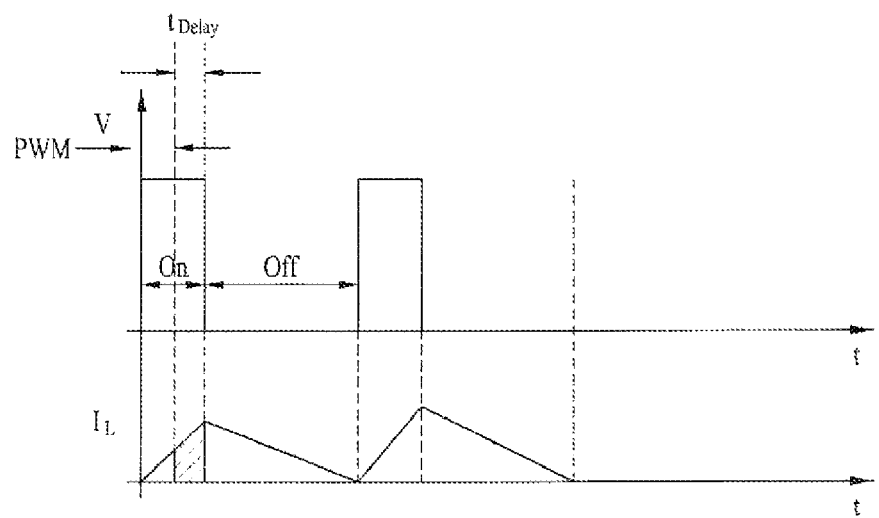
FIG. 1B is a waveform diagram of a PWM signal and a current flowing through a load in a low load state.
Figure 1C:
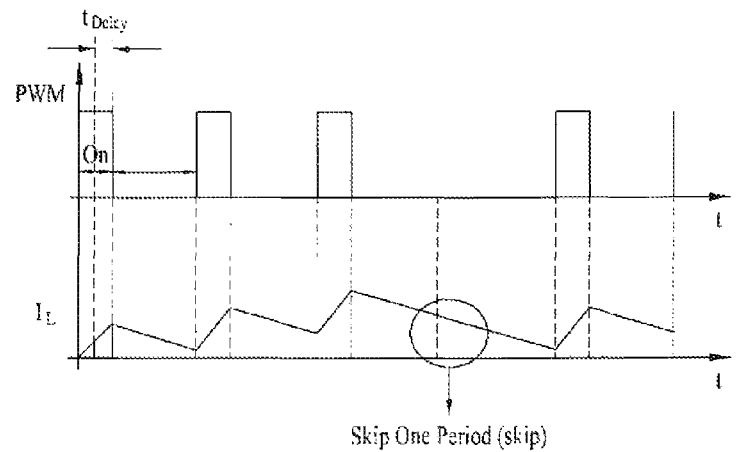
FIG. 1C is a waveform diagram in the case in which a PWM signal is skipped in a low load state.
Figure 2:
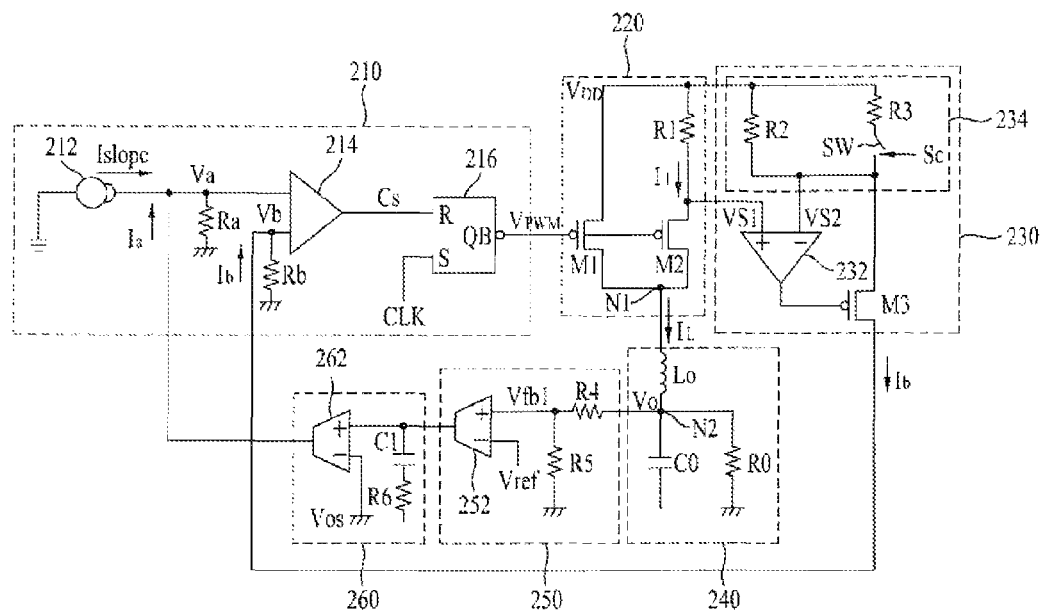
FIG. 2 is a circuit diagram illustrating a DC-DC converter according to embodiments.

FIG. 2 is a circuit diagram illustrating a DC-DC converter according to embodiments. Referring to FIG. 2, the DC-DC converter 200 includes a pulse width modulation (PWM) signal generator 210, a power switch unit 220, a sense amplifier unit 230, an output load unit 240, a voltage divider 250, and an error amplifier unit 260. The PWM signal generator 210 generates a PWM signal $V_{PWM}$ to control the power switch unit 220. The PWM signal generator 210 may also include a slope compensator 212, a first input resistor Ra, a second input resistor Rb, a PWM comparator 214, and an RS flip-flop 216.

The slope compensator 212 supplies a compensation current $I_{slope}$ to a first input terminal of the PWM comparator 214, in order to compensate for a slope of the PWM signal, which may have a duty ratio of 50% or more. The first input resistor Ra is connected between the first input terminal of the PWM comparator 214 and a ground voltage. The second input resistor Rb is connected between a second input terminal of the PWM comparator 214 and the ground voltage.

The PWM comparator 214 compares a first voltage Va and a second voltage Vb, and outputs a comparison signal Cs according to a result of the comparison. The first voltage Va is determined based on a current obtained by summing the compensation current $I_{slope}$ and the feedback current Ia. The second voltage Vb is determined based on a sensing current Ib. The feedback current Ia will be described later. An RS flip-flop 216 may be used to output the comparison signal Cs, as the PWM signal $V_{PWM}$, in response to a clock signal CLK.

The power switch unit 220 is turned on or off, based on the PWM signal $V_{PWM}$. The power switch unit 220 may include a first resistor R1, a first power switch M1, and a second power switch M2. The first resistor R1 is connected between a first voltage VDD and the second power switch M2. That is, one end of the first resistor R1 is connected to the first voltage VDD, and the other end of the first resistor R1 is connected to the second power switch M2.

The first power switch M1 is connected between the first voltage VDD and a first node N1. The first power switch M1 is turned on or off in response to the PWM signal $V_{PWM}$. The second power switch M2 is connected between the first resistor R1 and the first node N1. The second power switch M2 is turned on or off in response to the PWM signal $V_{PWM}$.

The sense amplifier unit 230 senses a current I1 flowing through the power switch unit 220, for example, a current flowing through the first resistor R1, and outputs the sensing current Ib, based on the sensed result. In this case, the sensing current Ib is adjusted based on a load control signal Sc. The sense amplifier unit 230 may include a sense amplifier 232 and a sensing load unit 234. For example, the sense amplifier 230 may adjust the sensing current Ib such that the slope of the sensing current Ib may be increased in a low load state.

The sense amplifier 232 may amplify a difference between a first sensing voltage VS1 sensed based on the current I1 flowing through the second power switch M2, for example, the current flowing the first resistor R1, and a second sensing voltage VS2 sensed based on a voltage applied across the sensing load unit 234. The sense amplifier 232 has a first input terminal (+) connected to the other end of the first resistor R1, and a second input terminal (−) connected to the sensing load unit 234.

The sensing load unit 234 may be connected between the first voltage VDD and the second input terminal (−), and controls the resistance value of the sense load unit 234 between the first voltage VDD and the second input terminal (−), based on the load control signal Sc. The sensing load unit 234 may perform a control operation to reduce the resistance value between the first voltage VDD and the second input terminal (−) in the low load state.

For example, the sensing load unit 234 includes a second resistor R2, a third resistor R3, and a load switch SW. The second resistor R2 is connected between the first voltage VDD and the second input terminal (−). The third resistor R3 is connected between the first voltage VDD and the load switch SW. The load switch SW is connected between the third resistor R3 and the second input terminal (−). The load switch SW is turned on or off based on the load control signal Sc. The load control signal Sc turns on the load switch SW in a first mode, namely, in a low load state, and turns off the load switch SW in a second mode, namely in a high load state.

The sensing load switch M3 is connected between the sensing load unit 234 and the second input terminal of the PWM comparator 214. The sensing load switch M3 is turned on or off based on an output from the sense amplifier 232. That is, when the sensing load switch M3 is turned on, the sensing current Ib is supplied to the second input terminal of the PWM comparator 214. The sensing current Ib can be controlled in accordance with the turning-on or off of the load switch SW, The output load unit 240 may be connected between the first node N1 and the ground voltage. The output load unit 240 generates a load voltage Vo in accordance with the turning-on or off of the power switch unit 220. For example, the output load unit 240 may include an output inductor Lo, an output capacitor Co, and an output resistor Ro. The output inductor Lo is connected between the first node N1 and the second node N2. The output capacitor Co and output resistor Ro are connected between the second node N2 and the ground voltage.

The first voltage Va applied to the first input terminal of the PWM comparator 214 may be determined based on the load voltage Vo. In detail, the feedback current Ia flowing through the first input terminal may be determined in accordance with the load voltage Vo. The first voltage Va may be determined based on the feedback current and the compensation current $I_{slope}$.

A voltage divider 250 may be connected between the second node N2 and the ground voltage. The voltage divider 250 divides the load voltage Vo generated from the output load unit 240, thereby generating a divided voltage Vfb1. The voltage divider 250 amplifies a difference between the divided voltage Vfb1 and a reference voltage Vref, and outputs the amplified result. For example, the voltage divider 250 may include a fourth resistor R4, a fifth resistor R5, and a first amplifier 252.

The fourth resistor R4 may be connected between the second node N2 and a first input terminal (+) of the first amplifier 252. The fifth resistor R5 may be connected between the first input terminal (+) of the first amplifier 252 and the ground voltage. The first amplifier 252 amplifies the difference between the divided voltage Vfb1 applied to the first input terminal (+) of the first amplifier 252 and the first reference voltage Vref, and outputs the amplified result.

An error amplifier unit 260 may be connected between the voltage divider 250 and the first input terminal of the PWM comparator 214. The error amplifier unit 260 amplifies a difference between a second reference voltage Vos and the output from the first amplifier 252, and outputs the amplified result as the first voltage Va. For example, the error amplifier unit 260 may include an error amplifier 262, a first capacitor C1, and a sixth resistor R6.

In the low load state, the load control signal Cs turns on the load switch SW. As a result, the resistance value of the sense load unit 234 is reduced. As the resistance value of the sense load unit 234 is reduced, the sensing current Ib flowing through the second input terminal of the PWM comparator 214 is increased, so that the slope of the second voltage Vb applied to the second input terminal of the PWM comparator 214 is increased. As the slope of the second voltage Vb increases, the delay of the PWM signal $V_{PWM}$ is reduced.

Figure 3A:
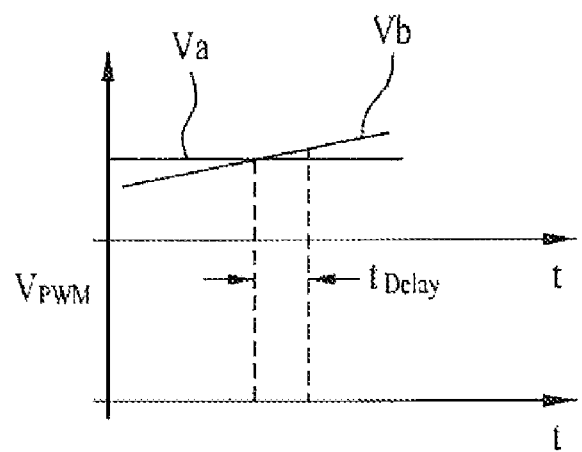
FIG. 3A is a waveform diagram of a PWM signal generated in a DC-DC converter having a general sense amplifier unit.
Figure 3B:
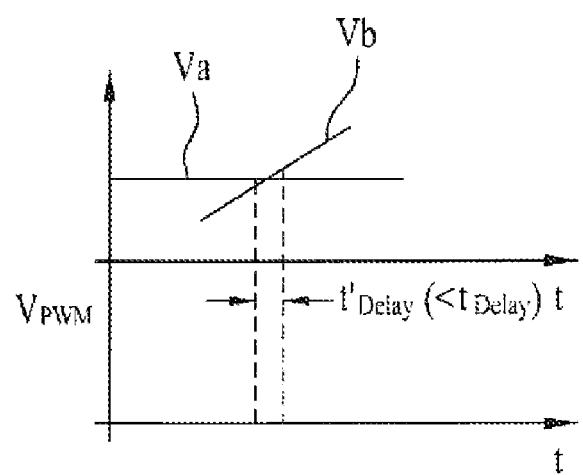
FIG. 3B is a waveform diagram of a PWM signal generated in the DC-DC converter, which has a sense amplifier unit according to embodiments.

FIG. 3A depicts the PWM signal generated in a DC-DC converter having a related sense amplifier unit. FIG. 3B depicts a PWM signal generated in the DC-DC converter, which has the sense amplifier unit according to embodiments. Referring to FIGS. 3A and 3B, the PWM signal generated in the DC-DC converter having the sense amplifier unit according to embodiments is minimized as the slope of the second voltage Vb increases ($t'_{Delay} < t_{Delay}$).

Figure 4:
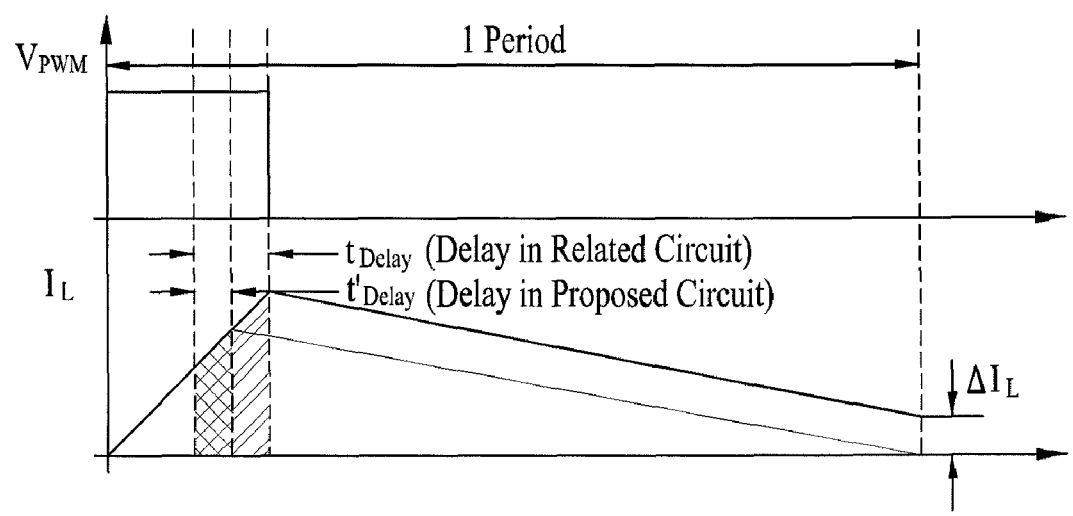
FIG. 4 is a waveform diagram of a current flowing through a load when a PWM signal is delayed.

FIG. 4 depicts a waveform of the current $I_L$ flowing through the load when the PWM signal is delayed. Referring to FIG. 4, it can be seen that no pulse skip in the PWM signal occurs because the discharge time of the current IL flowing through the load in the DC-DC converter having the sense amplifier unit according to embodiments increases as the delay time of the PWM signal decreases. Accordingly, stable operation of the DC-DC converter may be obtained.

As apparent from the above description, the DC-DC converter according to embodiments varies the resistance value used to determine the sense ratio of the sense amplifier used in a general current mode converter, to reduce the delay of the PWM signal. Accordingly, it is possible to obtain stable operation.

Thus, in a comparator hysteresis characteristics may be varied when the level of a comparison signal (or an input signal) applied to the comparator is varied, when various input signals are used, or when severe noise is generated. Also the affect of noise generated in circuits of peripheral environments or an offset generated during a CMOS process may be minimized. Where the voltage regulator is a low dropout (LDO) regulator, it is possible to accurately inform an external appliance of a point of time when an output voltage from the voltage regulator is normally output.

It will be obvious and apparent to those skilled in the art that various modifications and variations can be made in the embodiments disclosed. Thus, it is intended that the disclosed embodiments cover the obvious and apparent modifications and variations, provided that they are within the scope of the appended claims and their equivalents.

What is claimed is:

1. A device comprising:
    a pulse width modulation signal generator for outputting a pulse width modulation signal;
    a power switch unit connected between a first voltage and a ground voltage, the power switch unit being turned on or off based on the pulse width modulation signal; and
    a sense amplifier unit for sensing a current flowing through the power switch unit, and outputting a sensing current, the sense amplifier unit controlling the sensing current based on a load control signal,
    wherein the pulse width modulation signal is controlled based on the sensing current controlled by the sense amplifier unit, such that as a load on the device is reduced, the sensing current is increased so as to effectuate a reduction in a delay of the pulse width modulation signal.

2. The device of claim 1, wherein the sense amplifier unit comprises:
    a sense amplifier for amplifying a first sensing voltage sensed based on the current flowing through the power switch unit and a second sensing voltage, and outputting a result of the amplification;
    a sensing bad unit for supplying the second sensing voltage to the sense amplifier, and controlling the second sensing voltage based on the load control signal; and
    a sensing switch for outputting the sensing current according to the first and second sensing voltages in response to the output from the sense amplifier.

3. The device of claim 1, wherein the sense amplifier unit comprises:
    a sense amplifier having a first input terminal connected to the power switch unit, and a second input terminal;
    a sensing load unit connected between the first voltage and the second input terminal, to control a resistance value between the first voltage and the second input terminal based on the load control signal; and
    a sensing switch connected between the second input terminal and the pulse width modulation signal generator, the sensing switch being turned on or off in response to an output from the sense amplifier.

4. The device of claim 3, wherein the sensing load unit comprises:
    a first resistor connected between the first voltage and the second input terminal;
    a second resistor connected to the first voltage at one end of the second resistor; and
    a load switch connected between the other end of the second resistor and the second input terminal, the load switch being turned on or off based on the load control signal.

5. The device of claim 4, wherein the load switch is turned on in a low load state.

6. The device of claim 4, wherein the load switch is turned off in a high load state.

7. The device of claim 3, wherein the sensing load unit controls the resistance value between the first voltage and the second input terminal such that the resistance value is reduced in a low load state.

8. The device of claim 1, comprising:
    an output load unit connected between the power switch unit and the ground voltage, to generate a load voltage in accordance with the turning-on or off of the power switch unit,
    wherein the pulse width modulation signal generator outputs the pulse width modulation signal depending on a second voltage based on the load voltage and a third voltage based on the sensing current.

9. The device of claim 1, wherein the sense amplifier unit controls the sensing current such that a slope of the sensing current increases.

10. The device of claim 1, wherein the device comprises a current mode DC-DC converter.

11. A method comprising:
    outputting a pulse width modulation signal from a pulse width modulation signal generator:
    turning on or off a power switch unit based on the pulse width modulation signal, the power switch unit connected between a first voltage and a ground voltage;
    sensing, with a sense amplifier unit, a current flowing through the power switch unit, and outputting a sensing current, the sense amplifier unit controlling the sensing current based on a load control signal; and
    controlling the pulse width modulation signal on the sensing current controlled by the sense amplifier unit, such that as a device load is reduced, the sensing current is increased so as to effectuate a reduction in a delay of the pulse width modulation signal.

12. The method of claim 11, wherein the sense amplifier unit comprises:
    a sense amplifier for amplifying a first sensing voltage sensed based on the current flowing through the power switch unit and a second sensing voltage, and outputting a result of the amplification:

a sensing load unit for supplying the second sensing voltage to the sense amplifier, and controlling the second sensing voltage based on the load control signal; and a sensing switch for outputting the sensing current according to the first and second sensing voltages in response to the output from the sense amplifier.

13. The method of claim 11, wherein the sense amplifier unit comprises:

a sense amplifier having a first input terminal connected to the power switch unit, and a second input terminal;

a sensing load unit connected between the first voltage and the second input terminal, to control a resistance value between the first voltage and the second input terminal based on the load control signal; and a sensing switch connected between the second input terminal and the pulse width modulation signal generator, the sensing switch being turned on or off in response to an output from the sense amplifier.

14. The method of claim 13, wherein the sensing load unit comprises:

a first resistor connected between the first voltage and the second input terminal;

a second resistor connected to the first voltage at one end of the second resistor; and a load switch connected between the other end of the second resistor and the second input terminal, the load switch being turned on or off based on the load control signal.

15. The method of claim 14, wherein the load switch is turned on in a low load state.

16. The method of claim 14, wherein the load switch is turned off in a high load state.

17. The method of claim 13, comprising:

controlling the resistance value between the first voltage and the second input terminal such that the resistance value is reduced in a low load state.

18. The method of claim 11, comprising:

generating, with an output load unit connected between the power switch unit and the ground voltage, a load voltage in accordance with the turning-on or off of the power switch unit, wherein the pulse width modulation signal generator outputs the pulse width modulation signal depending on a second voltage based on the load voltage and a third voltage based on the sensing current.

19. The method of claim 11, wherein controlling the sensing current includes increasing the slope of the sensing current.

20. The method of claim 19, wherein controlling the sensing current includes increasing the slope of the sensing current in a low load state.

* * * * *